United States Patent [19]
Vrillon

[11] 4,058,188
[45] Nov. 15, 1977

[54] MECHANICAL SHOCK-ABSORBING DEVICE

[75] Inventor: Bernard Vrillon, Wissous, France

[73] Assignee: Commissariat a l'Energie Atomique, Paris, France

[21] Appl. No.: 446,824

[22] Filed: Feb. 28, 1974

[30] Foreign Application Priority Data

Mar. 6, 1973   France ............................... 73.07934

[51] Int. Cl.² .............................................. F16F 7/12
[52] U.S. Cl. ................................................. 188/1 C
[58] Field of Search ................ 74/492; 188/1 B, 1 C; 293/70

[56] References Cited

U.S. PATENT DOCUMENTS

| 3,010,540 | 11/1961 | Dahlen | 188/1 C |
| 3,479,902 | 11/1969 | Okamoto | 188/1 C X |
| 3,762,279 | 10/1973 | Zeyher | 188/1 C X |

Primary Examiner—Duane A. Reger
Attorney, Agent, or Firm—Cameron, Kerkam, Sutton, Stowell & Stowell

[57] ABSTRACT

The shock-absorbing device consists of a plate, a cylindrical ring or an annular ring in which circular holes are formed in uniformly spaced relation so that the same cross-section of constituent material is present in all directions of application of forces during the shock impact.

6 Claims, 8 Drawing Figures

MECHANICAL SHOCK-ABSORBING DEVICE

This invention relates to a mechanical shock-absorbing device.

More precisely, the present invention is concerned with a shock-absorber which absorbs by deformation the energy of a body which is subjected to any movement of displacement, for example a body which falls from a certain height.

This is the case in particular in nuclear reactors such as fast reactors, for example. In the case of certain fuel handling stages, the different elements which constitute the reactor core are placed within tubes which have been swaged at the lower ends and are designated as handling buckets. These buckets are attached at the top ends by means of shearing pins to a carousel placed within a sodium-filled steel tank which is used for the transit of the fuel elements. If one element is accidentally released from the grab to which it is attached in the course of a handling operation, the element is liable to drop within said handling bucket. Thus a mass of the order of 500 kg would fall in that case from a height of about 10 m. Dropping of the handling bucket after shearing of the pins is liable to perforate the bottom of the handling tank and this can clearly have very serious consequences. It is therefore necessary to absorb the corresponding energy by means of a deformable shock-absorber.

The present invention and the advantages which it offers in comparison with the prior art will be more readily understood by referring to the accompanying drawings, in which.

Figure 5:
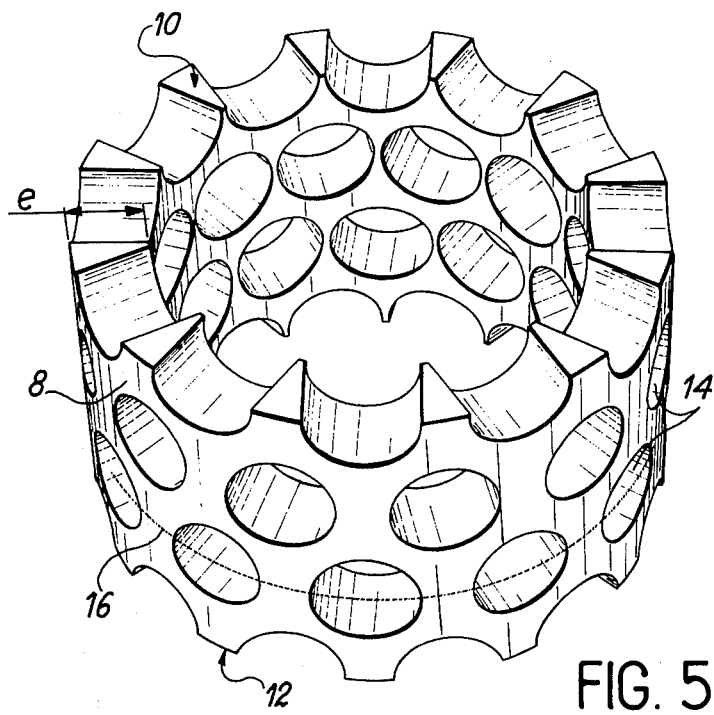
FIG. 5 is a perspective view of the shock-absorber in accordance with the invention and having the shape of a cylinder.
Figure 5:
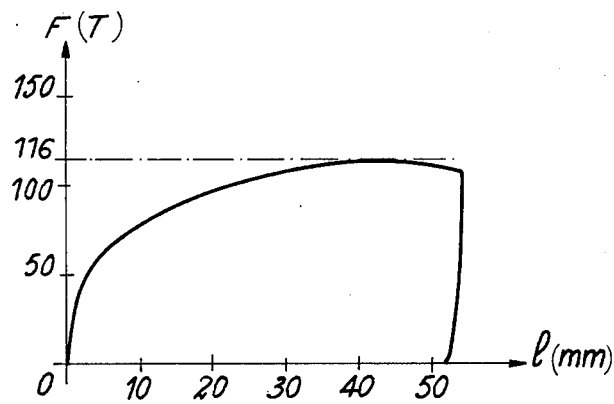
Figure 6:
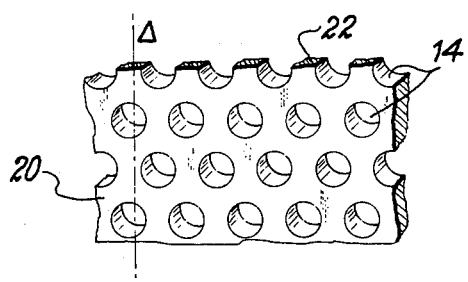
Figure 7:
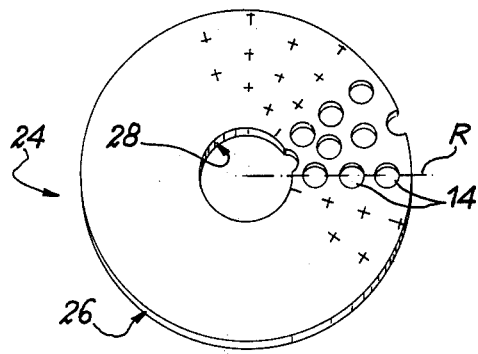

FIG. 5' shows the curve of deformation of the shock-absorber which is illustrated in FIG. 5;

FIGS. 6 and 7 are alternative forms of construction of said shock-absorber.

Tubular shock-absorbers which operate on the principle of axial compression are already known. These shock-absorbers are fabricated from tubes, elongated slots being formed in the tube wall and arranged in such a manner that the structure constitutes an assembly of small beams.

Figure 2:
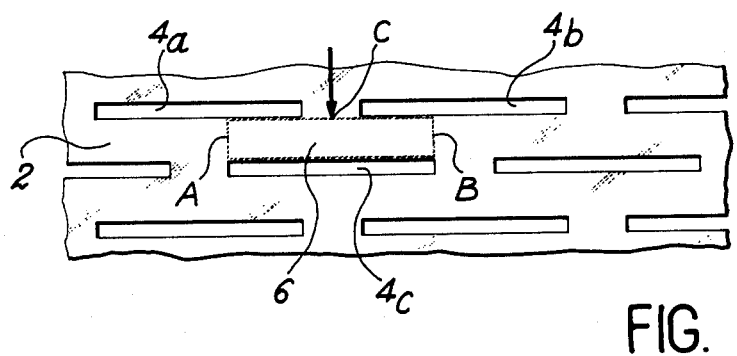
FIG. 2 shows a shock-absorber of the prior art.

This is shown in FIG. 2, in which a portion of the tube 2 is pierced by a series of rectangular slots $4a$, $4b$, $4c$, etc. For example the slots $4a$, $4b$, $4c$ limit a beam 6 which is shown in dotted lines. The beam 6 is fixed to the remainder of the tube at each extremity A and B and a force is applied to said beam at the point C between the elongated slots $4a$ and $4b$.

Figure 1:
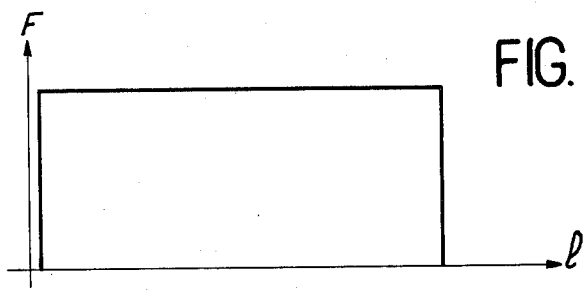
FIG. 1 shows a curve representing the deformation as a function of the applied force in the case of an ideal shock-absorber.
Figure 3:
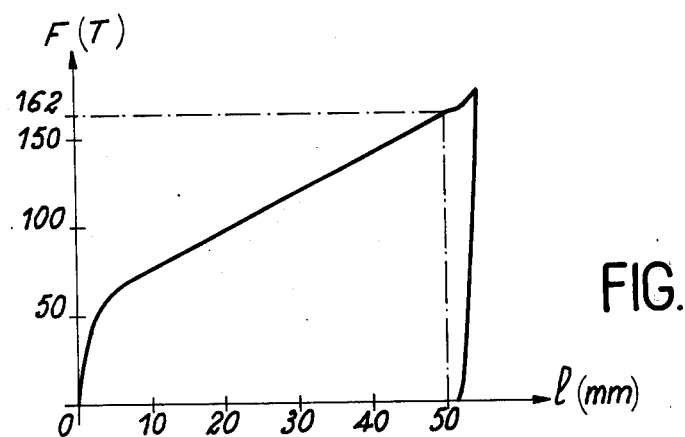
FIG. 3 shows the curve which gives the applied force as a function of the deformation in the case of the shock-absorber which is illustrated in FIG. 2.

Referring now to FIG. 3 which shows the applied force (plotted as ordinates) as a function of the deformation of the tube, it is observed that this curve is very different from the ideal deformation curve shown in FIG. 1. In fact, in the case of the ideal curve in respect of a given energy to be absorbed (proportional to the area limited by the curve), the applied force is constant during deformation and is of minimum value. It is observed on the contrary in FIG. 3 that the applied force increases as the deformation increases and this is consequently very far from optimum conditions.

The foregoing can be explained by the fact that the entire assembly of beams such as the beam 6 is subjected to deformation under bending stress.

The precise aim of the present invention is to provide a shock-absorbing device which overcomes the disadvantages mentioned in the foregoing. In particular, the device produces a deformation curve which is much closer to the ideal deformation curve shown in FIG. 1. In addition, the shock-absorbing device in accordance with the invention is much easier to construct from a technological standpoint than comparable devices of the prior art.

The mechanical shock-absorbing device in accordance with the invention is essentially constituted by a plate of constant thickness pierced by circular orifices spaced at uniform intervals so as to ensure that the material constituting said plate has the same cross-section in all directions in which a force is applied during a shock impact.

In a first embodiment, the shock-absorbing device has the shape of a cylindrical ring; in a second embodiment, the shock-absorbing device has the shape of a flat rectangular plate; in a third embodiment, the shock-absorbing device has the shape of an annular ring.

A better understanding of the invention will in any case be obtained from the following description of three embodiments of the invention which are given by way of example without any limitation being implied.

A first form of construction of the shock-absorbing device is shown in perspective in FIG. 5. This device has the shape of a cylindrical ring 8 of constant thickness $e$. Said cylindrical ring is limited at the top by a section plane 10 and at the bottom by a section plane 12. During use, the face corresponding to the top plane 10 is intended to receive the object at the end of travel of this latter in the event of occurrence of a free fall. The face 12 bears on the support which it is desired to protect against the object which is liable to fall. The ring 8 is pierced by circular orifices such as the orifice 14. Said orifices are uniformly spaced on circles of said ring such as the circle 16.

Figure 4:
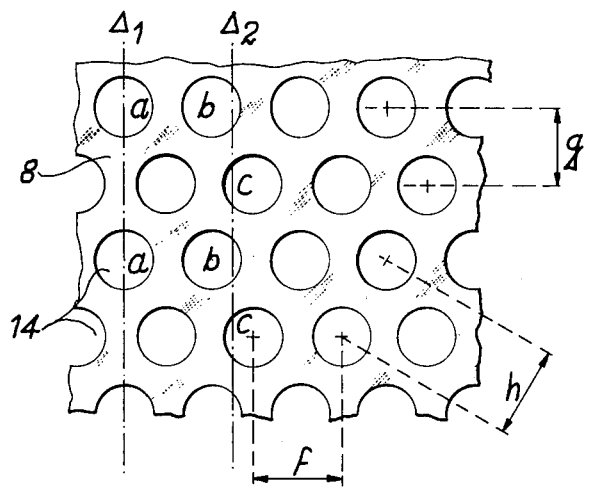
FIG. 4 is a partial and diagrammatic view showing the shock-absorber in accordance with the invention.

In FIG. 4, a portion of the ring is shown diagrammatically in order to define the positions of the circular orifices 14 with respect to each other. It is in fact desired to obtain in the direction of the generator lines of the cylinder a substantially constant quantity of empty space along all the generator-lines, that is to say a constant quantity of material along each generator-line. It must be ensured that the distance between two holes $f$ is constant in a plane at right angles to the axis. The spacing $g$ between two layers of holes (placed on the same circle 16) must be such that there is practically no difference between the oblique distance $h$ between two holes and the distance $f$ between two adjacent holes of the same layer. It must also be ensured that, on the generator-line $\Delta_1$ which intersects the circles along the diameters of length $a$ and on the generator-line $\Delta_2$ which intersects the orifices 14 on portions of lengths $b$ and $c$, we have the relation $$2a \simeq 2c + 2b$$

The thickness $e$ of the cylindrical ring is determined as a function of the energy to be absorbed. In fact, the absorbed energy is substantially proportional to the thickness $e$ of said plate.

By way of example, there has been constructed a shock-absorbing device having an external diameter of 185 mm, a thickness of 25 mm and a height of 112 mm. The device has two rows of twelve identical equidistant holes and has one row of half-holes at each end. Each hole has a diameter $a$ of 36 mm and each center of the holes of two successive layers has an angular displacement of 15°.

This shock-absorbing device was made of stainless steel. The curve obtained is shown in FIG. 5'. It is apparent that this curve is fairly closely related to the ideal curve. The total absorbed energy in slow compression was 47 900 J, the maximum of compressive force was 116 metric tons, and the maximum recorded travel or deformation was 50 mm.

The absorbed energy corresponding to the total distance of compression of said shock-absorbing device can be varied by modifying the diameter of the holes.

If $E_1$ is the energy absorbed by a given shock-absorbing device and $E_2$ is the energy absorbed by a shock-absorbing device which is extrapolated from the first device, it has proved feasible to stablish experimentally that:

$$\frac{E_1}{E_2} \simeq \left( \frac{h_1 - a_1}{h_2 - a_2} \right)^{3/2} \quad \text{See FIG. 4}$$

This relation is valid in the case of two shock-absorbers having the same geometrical characteristics and constructed of stainless steel.

The index 1 relates to the original shock-absorber and the index 2 relates to the extrapolated shock-absorber.

The curves of deformation of two shock-absorbers which differ only in the diameter of holes are substantially homothetic over a given range and the maximum compressive forces are approximately in the same ratio as the corresponding energies.

It is important to note that the absorbed energy and the maximum deformation stress of a shock-absorber are dependent on the compression velocity. The modes of deformation of the constituent material of the shock-absorber are complex. It is necessary to carry out dynamic compression and slow compression tests on a few prototypes in order to determine the ratio between the energies absorbed in both cases.

It has been possible to measure experimentally ratios of $$\frac{\text{Energy or dynamic compression}}{\text{Energy or slow compression}}$$

in the case of one and the same shock-absorbing device, namely of the order of 2 in respect of velocities of 4 meters per second and of the order of 2.5 to 3 in respect of velocities of 11 meters per second.

It is readily apparent that, in order to construct a shock-absorbing device of this type, different kinds of materials may be employed on condition that they are capable of substantial deformation prior to failure. Apart from stainless steel, use can be made of the mild steels or the austenitic stainless steels such as type ZO3CN 18-10 steel. It would also be possible to employ metals such as annealed copper, silver, aluminum.

There is shown in FIG. 6 a shock-absorbing device having the shape of a flat rectangular plate 20. The force is applied to the top edge 22 of said plate 20. The holes have substantially the same "length" in the vertical directions (namely the directions parallel to $\Delta$). It is apparent that the holes have the same arrangement as in the case of the cylindrical ring.

FIG. 7 illustrates another alternative form of construction in which the shock-absorbing device has the shape of an annular ring 24. By way of example, the external edge 26 is inserted in a stationary support and the bore 28 of said ring is intended to receive the object for the purpose of damping the falling motion of this latter. There is the same quantity of material along each of the radii R.

It is clearly possible to increase the damping length or stopping distance by placing a number of shock-absorbing devices in series. A parallel assembly of several shock-absorbing devices is capable of withstanding high impact loads without any need for special arrangements.

What I claim is:

1. A mechanical shock-absorbing device comprising a metal cylindrical ring, an axis for said ring, an internal diameter for said ring, an external diameter for said ring, a height for said ring along said axis, said internal and external diameters defining the thickness of said cylindrical ring which is the difference between said diameters, said internal and external diameters being constant along said height of said cylindrical ring, said thickness being on the order of one-sixth of said external diameter and a plurality of circular orifices in and over the surface of said cylindrical ring, said circular orifices being so disposed in circles on said ring that there is the same cross-section of metal along each generator line of said cylindrical ring.

2. A shock-absorbing device according to claim 1, wherein the circles on which the circular orifices are disposed are in equidistant relation.

3. A shock-absorbing device according to claim 2, wherein the orifices which are located on the same generator-line of the cylindrical ring have centers which are located on alternate circles.

4. A shock-absorbing device according to claim 2, wherein the distance between the centers of two adjacent orifices located on the same circle is substantially equal to the distance between the center of an orifice located on one circle and the center of the nearest orifice located on the adjacent circle.

5. A shock-absorbing device according to claim 1, wherein said device is made of a metal which is capable of undergoing substantial deformation prior to failure and selected from the group comprising the mild steels and the austenitic stainless steels.

6. A shock-absorbing device according to claim 5, wherein said device is made of aluminum.

* * * * *